US011981253B2

(12) United States Patent
Singh et al.

(10) Patent No.: US 11,981,253 B2
(45) Date of Patent: *May 14, 2024

(54) VEHICLE LIGHT WITH DUAL PROJECTION FILM

(71) Applicant: Valeo North America, Inc., Troy, MI (US)

(72) Inventors: Shivi Singh, Seymour, IN (US); John Orisich, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,578

(22) Filed: Jul. 20, 2022

(65) Prior Publication Data

US 2022/0355730 A1 Nov. 10, 2022

Related U.S. Application Data

(63) Continuation-in-part of application No. 17/130,005, filed on Dec. 22, 2020, now Pat. No. 11,420,552, which is a continuation of application No. 15/991,615, filed on May 29, 2018, now Pat. No. 10,899,272.

(51) Int. Cl.
*B60Q 1/50* (2006.01)
*B60Q 1/076* (2006.01)
*B60Q 1/44* (2006.01)
*B60Q 3/76* (2017.01)
*B60R 16/03* (2006.01)
*F21S 41/25* (2018.01)

(52) U.S. Cl.
CPC ............... *B60Q 1/50* (2013.01); *B60Q 1/076* (2013.01); *B60Q 1/44* (2013.01); *B60Q 3/76* (2017.02); *B60R 16/03* (2013.01); *F21S 41/25* (2018.01); *B60Q 2400/50* (2013.01); *B60Q 2900/30* (2013.01)

(58) Field of Classification Search
CPC . B60Q 1/04; B60Q 1/076; B60Q 1/38; B60Q 1/50; B60Q 1/54; B60Q 1/144; B60Q 1/503; B60Q 3/76; G03B 21/10; G03B 21/13; G03B 21/26; G03B 21/60; G03B 21/62; G03B 21/625; F21S 41/25
See application file for complete search history.

(56) References Cited

U.S. PATENT DOCUMENTS

| 5,680,185 A | 10/1997 | Kobayashi et al. |
| 5,729,242 A | 3/1998 | Margerum et al. |
| 9,340,155 B2 | 5/2016 | Pisz et al. |

(Continued)

FOREIGN PATENT DOCUMENTS

| CN | 202896252 U | 4/2013 |
| EP | 2979926 A1 | 2/2016 |

(Continued)

*Primary Examiner* — Sultan Chowdhury
(74) *Attorney, Agent, or Firm* — Valeo North America, Inc.

(57) ABSTRACT

A vehicle light module, a headlight assembly, and a method for communicating information at a panel having transparent and opaque states; a projector device projects visual representations toward the panel where visual representations are displayed on the panel when in an opaque state and through the panel when in a transparent state.

20 Claims, 8 Drawing Sheets

(56) References Cited

U.S. PATENT DOCUMENTS

| | | |
|---|---|---|
| 10,466,392 B1* | 11/2019 | Melcher ............ G02F 1/133555 |
| 2002/0186568 A1 | 12/2002 | Strazzanti |
| 2009/0167966 A1 | 7/2009 | Nam et al. |
| 2012/0307337 A1 | 12/2012 | Bartug et al. |
| 2014/0028980 A1 | 1/2014 | Othmer |
| 2014/0085718 A1 | 3/2014 | Chen |
| 2015/0077327 A1 | 3/2015 | Pisz et al. |
| 2015/0081167 A1 | 3/2015 | Pisz et al. |
| 2016/0023665 A1 | 1/2016 | Sherony et al. |
| 2018/0037164 A1* | 2/2018 | Newman ................ G02F 1/153 |
| 2018/0090039 A1 | 3/2018 | Singireddy |
| 2018/0141414 A1* | 5/2018 | Lota ........................ B60Q 1/50 |
| 2019/0331998 A1* | 10/2019 | Kim ....................... G03B 21/62 |
| 2020/0001687 A1 | 1/2020 | Chow |

FOREIGN PATENT DOCUMENTS

| | | |
|---|---|---|
| WO | 20170002121 A2 | 1/2017 |
| WO | 20170002122 A2 | 1/2017 |

* cited by examiner

VEHICLE LIGHT WITH DUAL PROJECTION FILM

CROSS-REFERENCE TO RELATED APPLICATIONS

This application is a Continuation-In-Part (CIP) of Ser. No. 17/130,005 filed 22 Dec. 2020 (now published US2021/0170941), which is a continuation of U.S. application Ser. No. 15/991,615 filed May 29, 2018 (now issued U.S. Pat. No. 10,899,272), the disclosures of which are hereby incorporated in their entirety by reference herein.

TECHNICAL FIELD

This invention relates to lighting systems, and more particularly to a lighting device that utilizes a dual projection film to display information.

BACKGROUND

Motor vehicles contain numerous lighting devices for both interior and exterior illumination. For example, exterior vehicle lighting devices may perform stop lamp functions, tail lamp functions, headlamp functions, daytime running light functions, dynamic bending light functions, and fog lamp functions.

Vehicles often include various systems such as infotainment and navigation systems. The systems are usually mounted in a dashboard of a vehicle cabin for driver and front passenger access. Such systems are available to users inside the vehicle only. Looking at the dashboard may distract the driver and decrease the safety of the driver and passengers. Further, information may be displayed at various positions inside the vehicle for the convenience of the passengers. In recent years, screen that provides transparency and opacity have been developed. Polymer dispersed liquid crystal (PDLC) screens may provide both transparency and partial or complete opacity. PDLC screens include one or more layers of liquid crystal dispersions. The "background" description provided herein is for purposes of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

Embodiments described herein include the following aspects.

In one aspect, a vehicle light module is provided. The vehicle light module includes a panel having a transparent state and an opaque state; and a projector operable to project a visual representation toward the panel. The visual representation is displayed on the panel when in an opaque state and on a second surface when in a transparent state.

In one aspect, the vehicle light module includes a controller configured to change an operation state of the panel between the transparent state and the opaque state.

In one aspect, the controller controls a power supply to the panel.

In one aspect, the controller activates the power supply to the panel when in a transparent state and deactivates the power supply when in the opaque state.

In one aspect, the controller activates the power supply to the panel when in an opaque state and deactivates the power supply when in the transparent state.

In one aspect, the panel is a polymer dispersed liquid crystal (PDLC) screen.

In one aspect, the vehicle light module is included in a headlamp assembly.

In one aspect, the vehicle light module includes one or more optical elements configured to control an angle of projection of the visual representation on the second surface.

In one aspect, the second surface is a road, an interior floor, an interior space, or airspace in front of or around the vehicle.

In one aspect, the projector is operatively coupled to a head unit of a vehicle.

In one embodiment, a headlight assembly is provided. The headlight assembly includes one or more vehicle light modules. Each of the vehicle light module includes a panel having a transparent state and an opaque state; a projector operable to project a visual representation toward the panel; and wherein the visual representation is displayed on the panel when in an opaque state and on a second surface when in a transparent state.

In one embodiment, a method of communicating information via a vehicle light module, the method comprising receiving a visual representation; projecting the visual representation toward a panel having a transparent state and an opaque state; and wherein the visual representation is displayed on the panel when in an opaque state and on a second surface when in a transparent state.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1A:
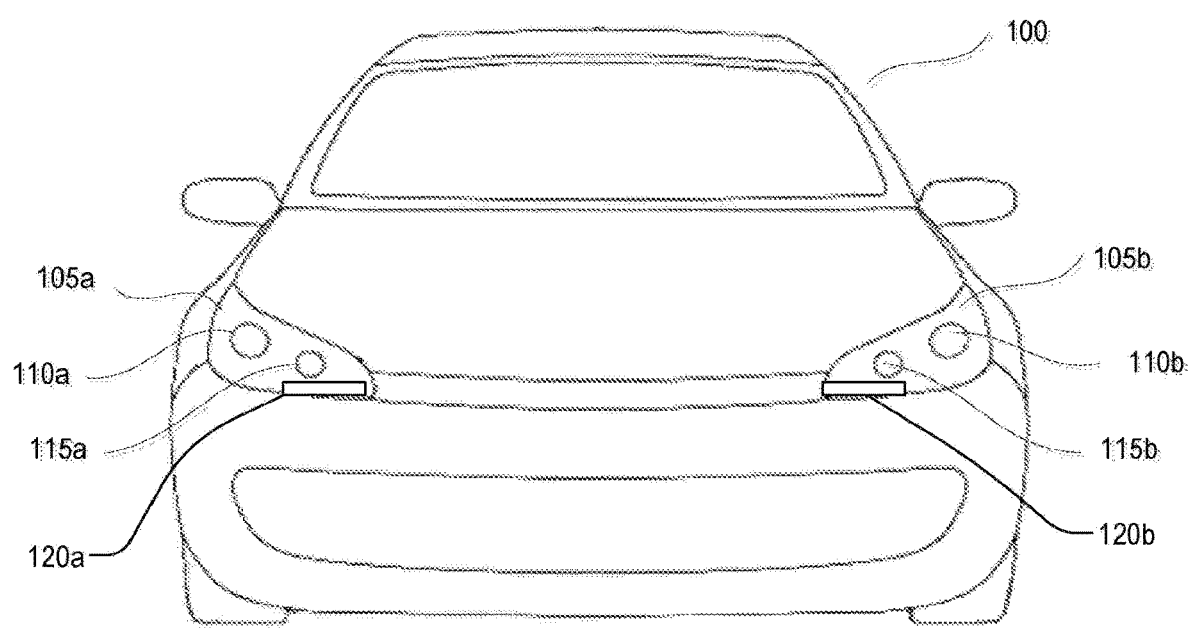
FIG. 1A illustrates a front-end of an exemplary motor vehicle according to one embodiment.

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in the specification, but rather is defined by the claims.

In the interest of clarity, not all of the features of the implementations described herein are shown and described in detail. It will be appreciated that in the development of any such actual implementation, numerous implementation-specific decisions will be made in order to achieve the developer's specific goals, such as compliance with application- and business-related constraints, and that these specific goals will vary from one implementation to another and from one developer to another.

Referring now to the drawings, wherein like reference numerals designate identical or corresponding parts throughout several views, the following description relates to a vehicle light module and associated methodology for communicating messages and information.

FIG. 1A illustrates a front-end of an exemplary motor vehicle 100. Motor vehicle 100 includes two headlamp assemblies 105a and 105b. Headlamp assemblies 105a and 105b include low beam headlamps 110a and 110b (also referred to as a lower or dipped beam), high beam headlamps 115a and 115b (also referred to as a main or driving beam), and vehicle light modules 120a and 120b. Typically, the low beam headlamps 110a and 110b are used whenever another vehicle is on the road directly ahead of motor vehicle 100 and/or whenever another vehicle is approaching motor vehicle 100 from an opposite direction. The vehicle light modules 120a and 120b may include a projector and a panel as described further below. The vehicle light modules 120a and 120b are used whenever the vehicle user wants to communicate with individuals outside the vehicle 100 and/or to display infotainment and navigation information (or other visual representation). The vehicle light module 120 may also be included in the vehicle taillight area and in light modules in the interior of the motor vehicle 100. The vehicle light module may also be included in side marker lamps in either or both side of the motor vehicle 100. The vehicle 100 may be any type of vehicle such as a car, truck, bus, helicopter, or motorcycle. The vehicle 100 may be gas-powered, diesel powered, electric, or solar-powered. The vehicle 100 may be actively operated by a driver or may be partially or completely autonomous or self-driving.

As will be further described, the displayed content can include personalized information or entertainment content such as navigation information or any other information originated onboard and/or off board the vehicle 100. The displayed content may be information for the vehicle user, other vehicle users (e.g., drivers), or pedestrians on the road. In one example, the vehicle user may communicate hazards. The displayed content may also be displayed via the taillight modules to vehicles behind the motor vehicle 100.

The light sources of the modules and headlamps may be supplied with power in a known manner by a device for controlling the supply of power to the light sources as would be understood by one of ordinary skill in the art. Such devices may include a converter for converting a voltage supplied by a current source of a motor vehicle, such as a car battery, into a charging voltage suitable for supplying power to the light source or sources. The power supply may also supply power to the screen as described later herein.

Figure 2:
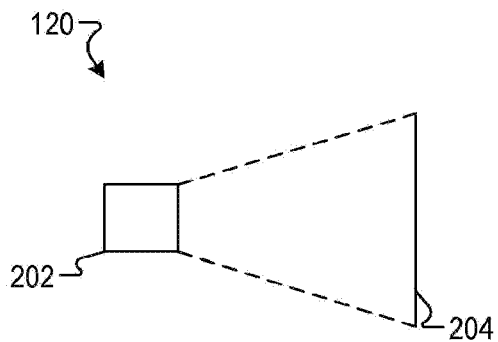
FIG. 2 is a schematic that illustrates a vehicle light module according to one example.
Figure 4:
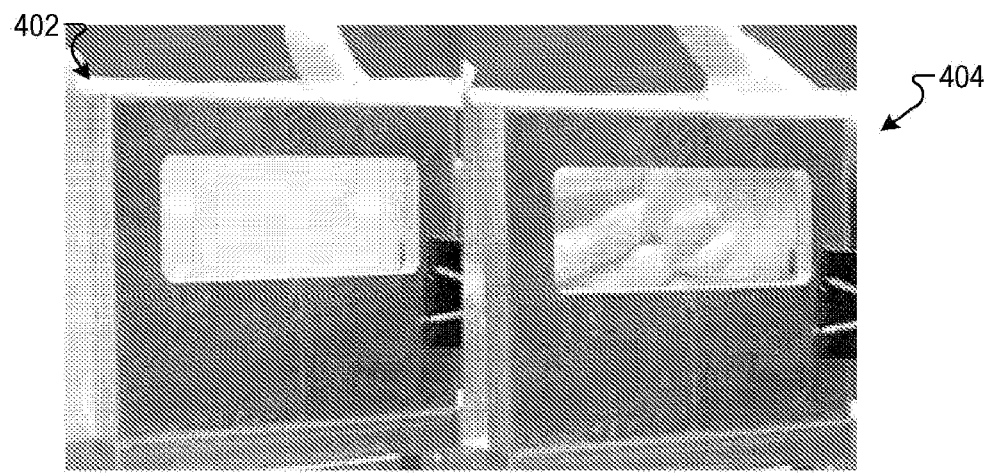
FIG. 4 illustrates an exemplary panel of the vehicle light module according to one example.

FIG. 2 is a schematic that illustrates the vehicle light module 120 according to one example. The vehicle light module 120 may include a projector 202 and a panel 204. The panel 204 may provide both transparency and partial or complete opacity. The panel 204 (i.e., screen, film) may be a polymer dispersed liquid crystal (PDLC) screen. The panel may also include polymer dispersed quantum dots, polymer dispersed nanoparticles, or the like as would be understood by one of ordinary skill in the art. The panel 204 may also include electrochromic elements whose transmission properties for light can be changed as a function of an applied voltage. When opaque, the panel 204 may have a milky opaque appearance. The panel 204 is opaque in an "Off" mode and is transparent in an "On" mode. In one implementation, the panel 204 is transparent in an "Off" mode and is opaque in an "On" mode. The "On" mode is activated by applying a current or voltage to the panel 204. In one implementation, the panel 204 may be a coating. The coating may a PDLC film applied to one or more parts of the headlamp assemblies 105a, 105b. Schematic 402 of FIG. 4 shows an exemplary panel 204 in an "Off" mode. Schematic 404 of FIG. 4 shows the exemplary panel 204 in an "On" mode. The exemplary panel 204 is opaque in the "Off" mode and transparent in the "On" mode.

The panel 204 may also include one or more panels. For example, the panel 204 can also include multiple switching film pieces/pixels to provide high control. Each of the panel 204 may be individually or collectively controlled.

In the "Off" mode, the panel 204 may display the information. In the "On" mode, the information is displayed on the road as described further below. The information may also be displayed on any surface or air space outside the vehicle. The light from the vehicle light module 120 may be added to light from other vehicle lights to satisfy photometric requirements of a function. The projector 202 may be coupled to a control module including a processor and a memory. The control module may be a portion of a central vehicle control, a stand-alone unit, or other system such as a cloud-based system. The processor may be any type of microprocessor having desired performance characteristics. The memory may include any type of computer readable medium which stores the data and control algorithms. The control module may connect via a network to one or more subsystems of the vehicle such as a head unit. The control module may also connect via the network to one or more electronic devices associated with the vehicle user.

The projector 202 may be a mini-projector, a pico projector, or a laser projector. The vehicle light module 120 may also include a plurality of optical elements. For example, the vehicle light module 120 may include one or more mirrors and one or more lenses. The angle of the one or more mirrors may be adjusted via the control module to change the position of the projected image. For example, the angle may be changed relative to the center line of the motor vehicle 100. Further, the size of the projected image may be changed by adjusting the one or more lenses and the one or more mirrors.

Aesthetic design considerations may include uniformity of the light projected on the road, color, shape and curvatures of the panels, and intensity of the light projected. The panel 204 may also be enhanced with pigments, nanoparticles, phosphors and other additives to change the optical characteristics of the panel 204.

In one example, the vehicle light module may be a part of the headlamp assembly 105a. The information (i.e., projected image) is projected on the road in front of the vehicle 100. The headlamp assembly 105a may include a plurality of the vehicle light modules 120. Each vehicle light module 120 may be controlled independently by the control module. In one implementation, each vehicle light module 120 may display the same image or information. For example, each image may be indicia of pedestrians crossing (e.g., footsteps). In one implementation, the vehicle light modules 120 may display complimentary images. For example, a first vehicle light module may display general information while a second vehicle light module may display details associated with the general information. For example, the first vehicle light module (e.g., 120a of FIG. 1) may project destination information and time to destination and the second vehicle light module (e.g., 120b of FIG. 1) may project the next navigational step from the navigational directions. Each vehicle light module 120 may display/project a portion of the information (e.g., image) to be displayed (e.g., navigation directions or map). In one implementation, the information to be displayed may be divided between two or more vehicle light modules 120. For example, when the information include navigation information displayed on a head unit. The control module may retrieve the navigation information from the head unit and divide the information between a plurality of vehicle light modules 120 such as to replicate the image or information displayed on the head unit on the road.

The vehicle light module 120 may be installed in the interior of the vehicle 100. In addition, the vehicle light module 120 may be included in a tail lamp assembly or any auxiliary lighting around the vehicle.

Figure 1B:
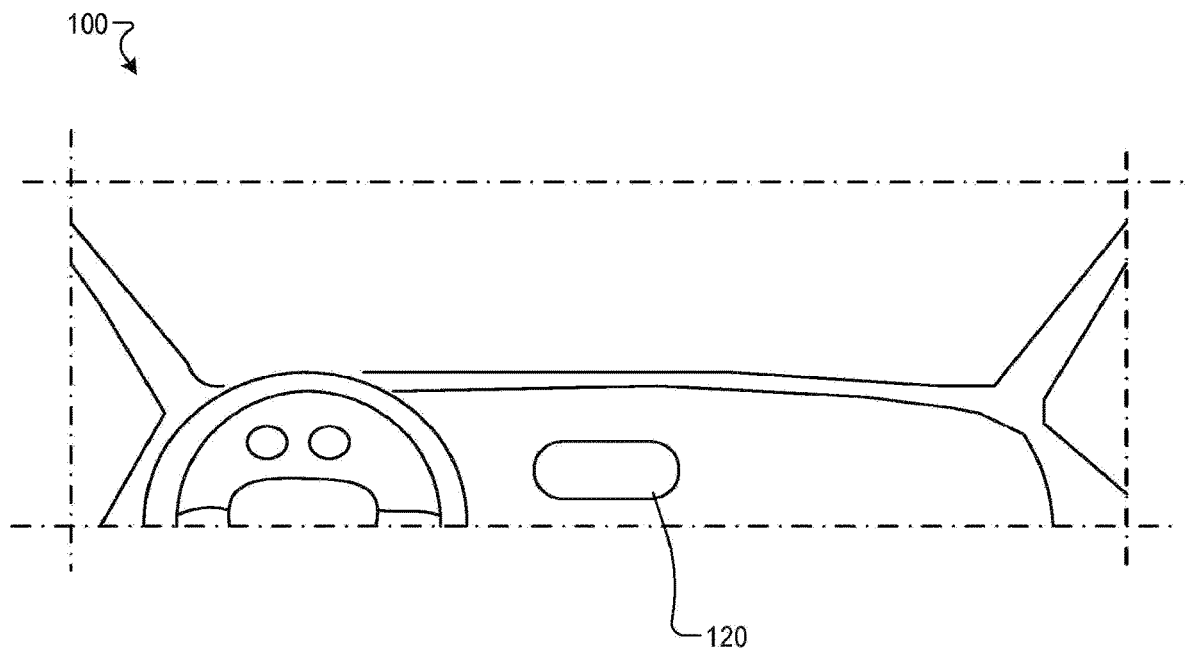
FIG. 1B illustrates an interior of the exemplary motor vehicle according to one embodiment.

FIG. 1B illustrates an interior of the exemplary motor vehicle 100 according to one embodiment. The vehicle light module 120 may be used as an infotainment screen. The vehicle light module may be installed on a rear side of a seat. The vehicle light module may be used as an infotainment screen to display information in the "OFF" mode. In an "ON" mode, the vehicle light module may be used as a reading light or projector.

Figure 1C:
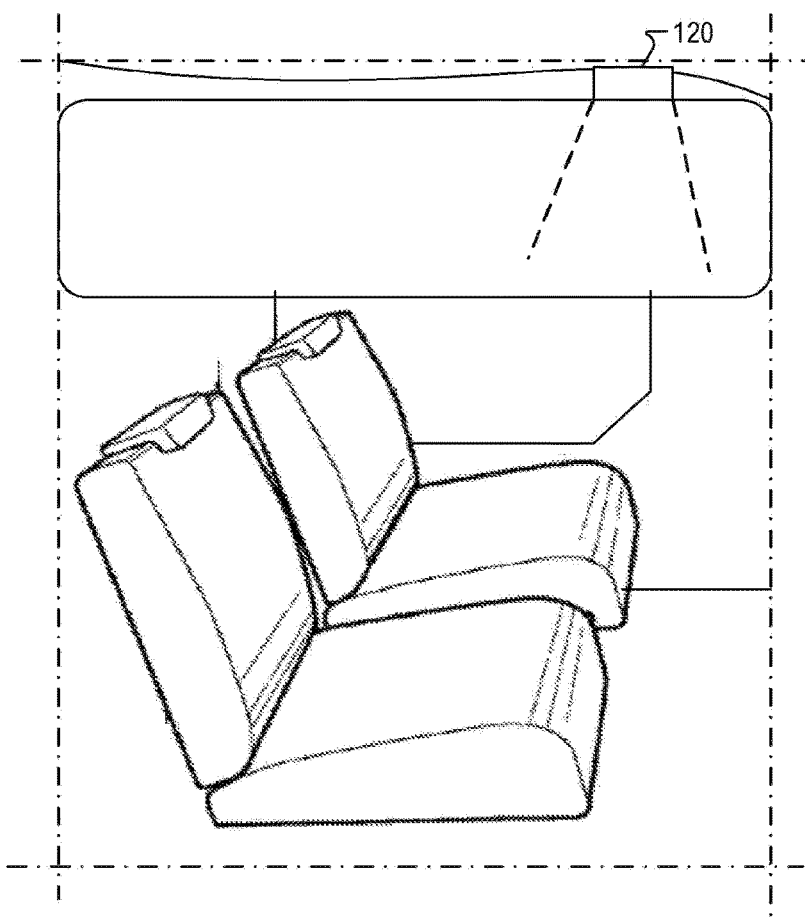
FIG. 1C illustrates the interior of the exemplary motor vehicle according to another embodiment.

FIG. 1C illustrates the interior of the exemplary motor vehicle 100 according to another embodiment. The vehicle light module 120 may be installed on the ceiling of the vehicle 100. The vehicle light module 120 may provide light such as reading light for the passengers. The vehicle light module 120 may also display aesthetic designs (e.g., stars) when in an "OFF" mode.

Figure 3A:
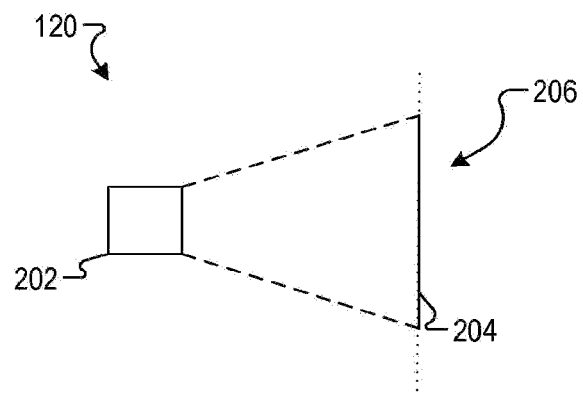
FIGS. 3A and 3B illustrate the vehicle light module in various operation modes according to one example.

FIG. 3A illustrates the vehicle light module 120 in an "Off" mode. The panel 204 is opaque and a plane of projection is indicated by 206. Thus, the information are displayed on the panel 204 when the vehicle light module 120 is operated in an "Off" mode.

Figure 3B:
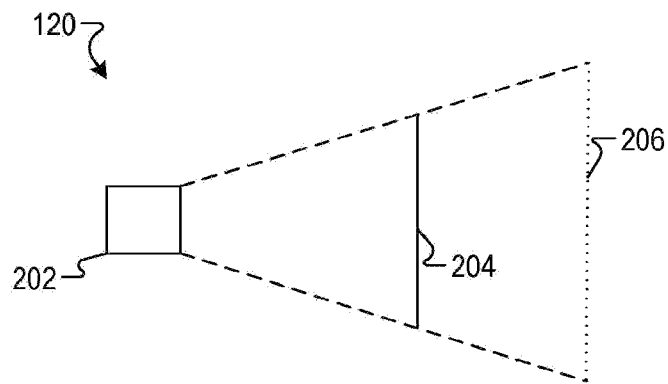

FIG. 3B illustrates the vehicle light module 120 in an "On" mode according to one example. The panel is transparent and does not block the light from the projector 202. The projection in the "On" mode is on the plane indicated by 206. The information are displayed on the plane 206. As a function of the orientation of the vehicle light module 120, the information may be displayed on the road in front of the vehicle 100 or to the side of the vehicle 100. In one implementation, the information may be projected on the back or side of another vehicle.

Figure 5A:
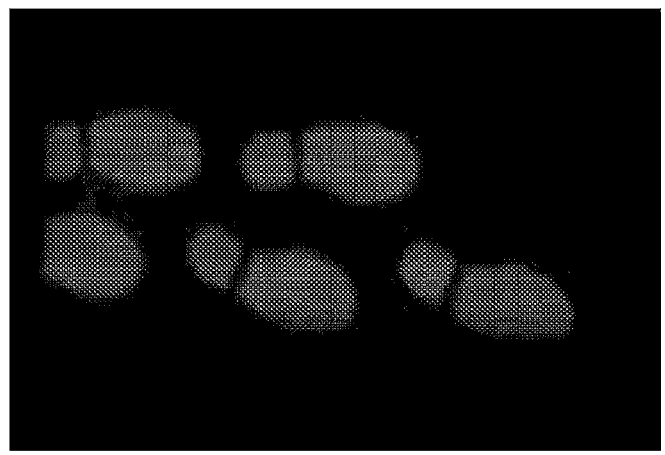
FIGS. 5A and 5B are schematics that illustrate the operation of the vehicle light module according to one example.
Figure 5B:
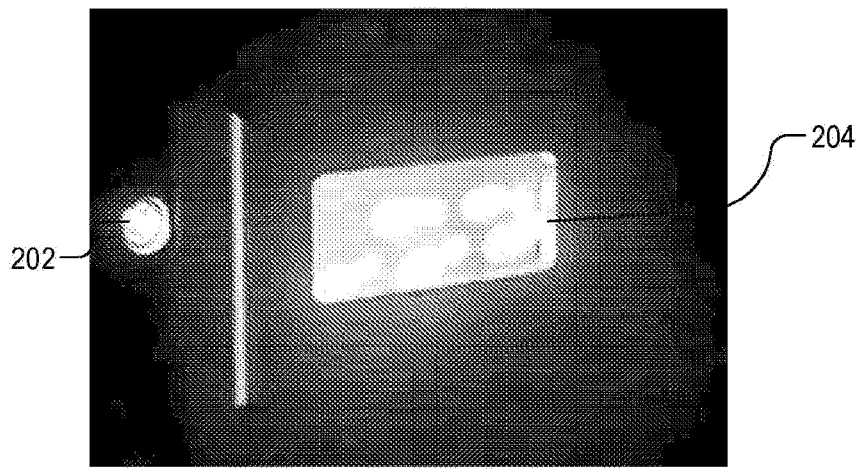

In one implementation, the two headlamps may project similar information on the road in front of the vehicle. For example, both vehicle light modules 120a, 120b associated with the headlamp assemblies 105a and 105b may project crossing lines for the pedestrians as shown in FIG. 5A. The vehicle light module 120 of a rear lamp may be in the "On" mode and displays an indication that pedestrian are crossing in front of the vehicle as shown in FIG. 5B.

Figure 6A:
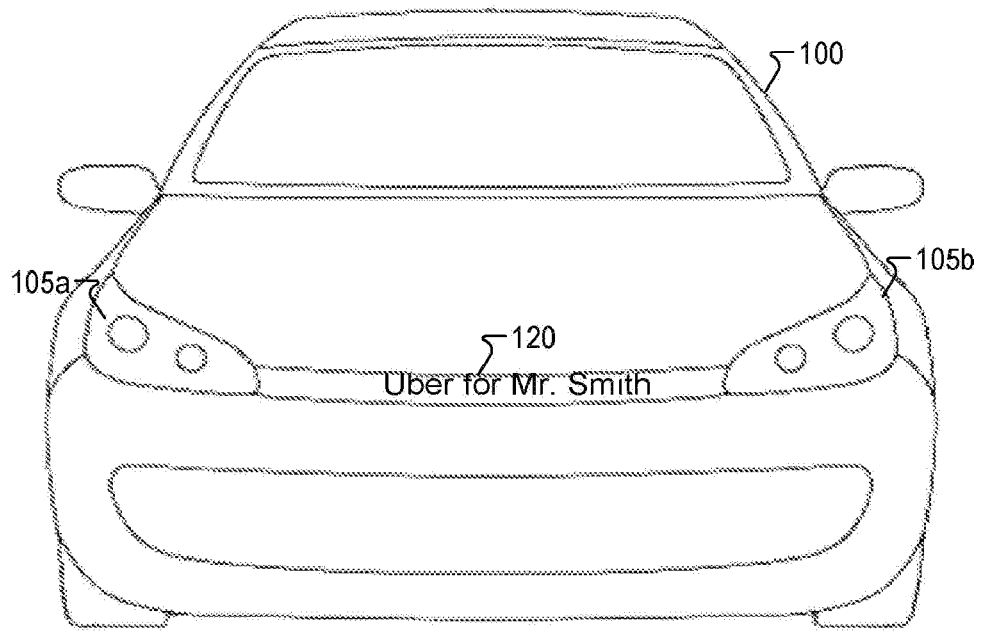
FIGS. 6A-6D are schematics that illustrate various positioning of the vehicle light module according to one example.

FIG. 6A is a schematic that shows the vehicle light module 120 installed on the front of vehicle 100 between the two headlamp assemblies 105a and 105b. In one example, the vehicle light module 120 may display ride sharing information.

Figure 6B:
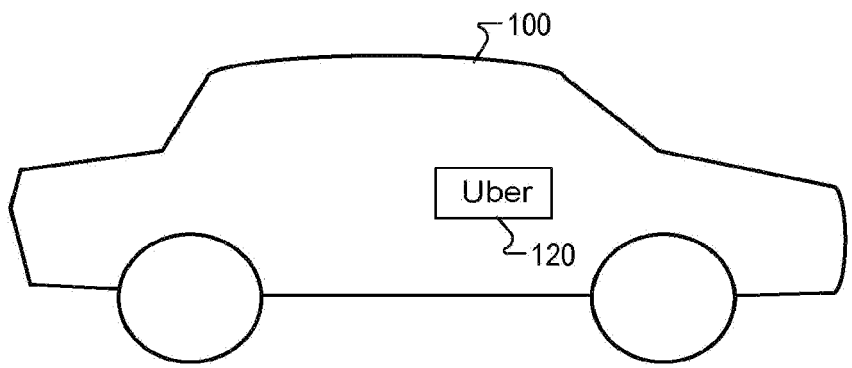

FIG. 6B is a schematic that shows the vehicle light module 120 installed on the side of vehicle 100. For example, the vehicle light module 120 may be installed on the front door or back door of the vehicle 100 on the passenger side. In one example, the vehicle light module 120 may display information associated with the type of the vehicle (e.g., ride sharing, taxi, or the like).

Figure 6C:
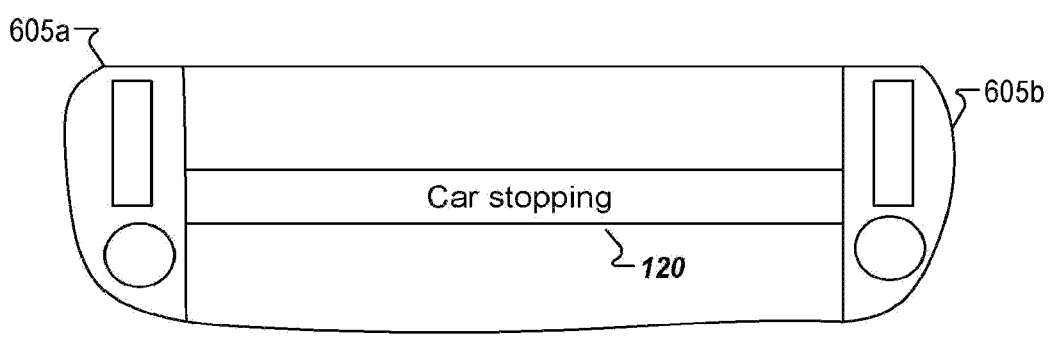

FIG. 6C is a schematic that shows the vehicle light module 120 installed on the rear of vehicle 100 between rear light assemblies 605a and 605b. The vehicle light module 120 may display information to a vehicle following the vehicle 100. For example, the vehicle light module 120 may display notices and information associated with the driver next navigation maneuver which increases safety and minimizes traffic accidents.

Figure 6D:
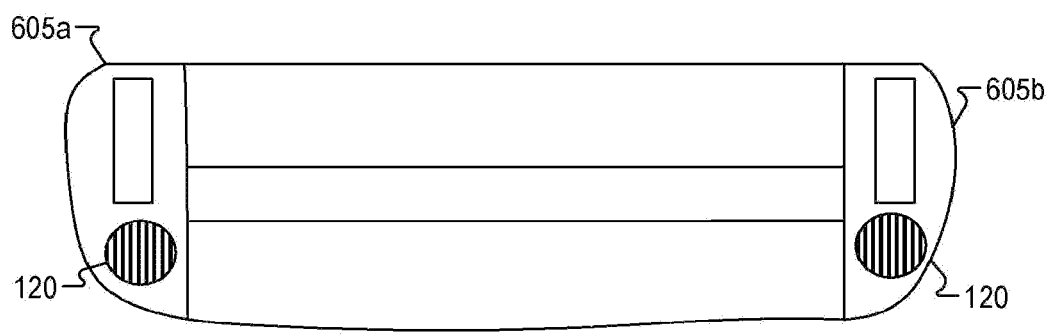

FIG. 6D is a schematic that shows the vehicle light module 120 installed in the rear light assemblies. The vehicle light module 120 may provide light color from the projector for legal functions. For example, the projector may provide red color light for stop/brake function as shown in FIG. 6D. The vehicle light module may also display a plurality of colors when displaying pictographs.

Figure 7:
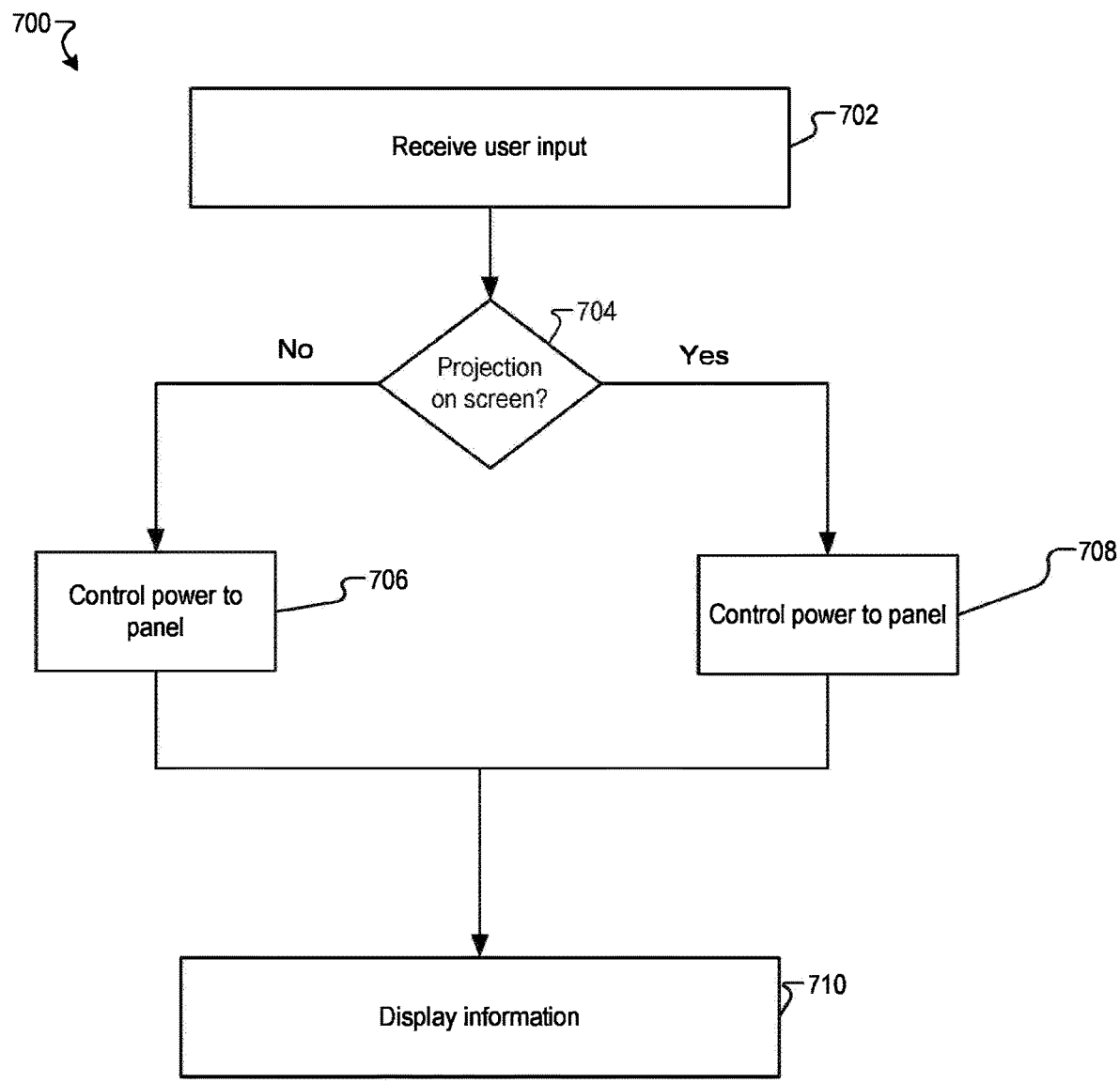
FIG. 7 is a flowchart for a notification process using the vehicle light module according to one example.

FIG. 7 is a flowchart for a notification process 700 using the vehicle light module 120 according to one example. At step 702, the control module may receive a user input from a vehicle user. The user input may be sent via the head unit, via a voice command, or an electronic device associated with the vehicle user. The user input may include a selection between panel display or road projection display, the information source, a duration (e.g., display information for 5 minutes, update and display information continuously), and a location (e.g., front headlamp, side, rear). The control module may receive a visual representation or a legal light output/function such as turn, stop, tail, and the like. At step 704, the control module may determine whether the information associated with the user input is to be displayed one the screen or on the road. In response to determining that the information is to be displayed on the screen resulting in a "yes" at step 704, the process proceeds to step 708. In response to determining that the information associated with the user input are for road projection, resulting in a "no" at step 704, the process proceeds to step 706.

At step 708, the control module may turn off the power to the screen 204 in response to determining that the power is turned on. The process proceeds to step 710. At step 706, the control module may turn on the panel when the power to the panel is off. Then, the process proceeds to step 710.

At step 710, the projector 202 is activated and the information is displayed. For example, the screen 204 may display information associated with ride sharing such as customer name and the name company of the ride sharing service. The information may be retrieved from an electronic device (e.g., smartphone) associated with the driver and connected to a network of the vehicle.

In one implementation, the vehicle light module may be coupled to one or more cameras. The one or more cameras may be configured to capture scene from outside and/or inside the vehicle 100. The captured scene may be coupled with pictographs or other graphic representations. The captured may be displayed on the screen or projected on an outer surface an interior surface as described previously herein.

Figure 8:
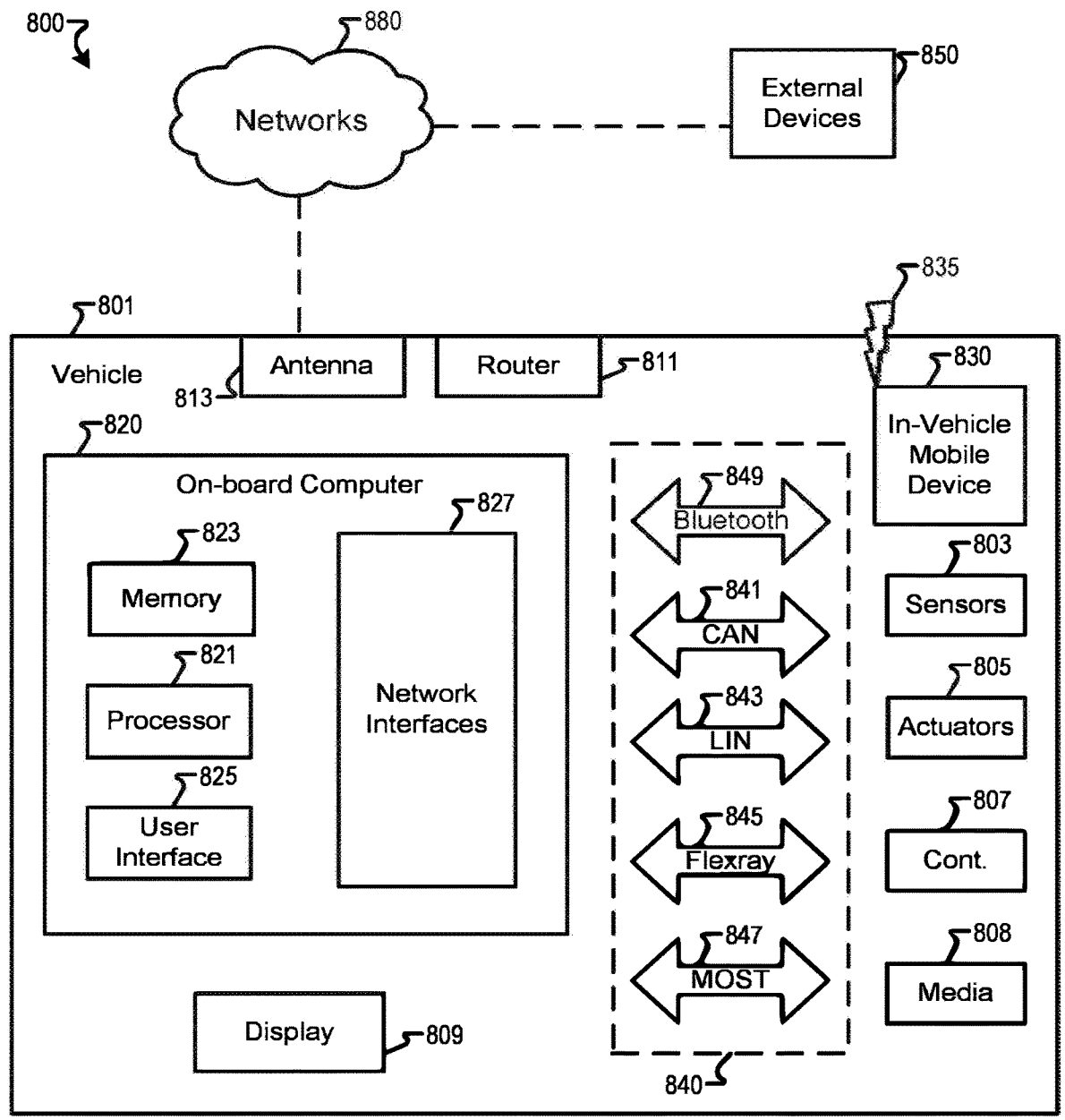
FIG. 8 is a simplified block diagram of a vehicle environment according to one example.

FIG. 8 is a simplified block diagram of a vehicle environment 800 in which embodiments of the invention disclosed herein may be implemented. The vehicle environment 800 includes a vehicle 801 in communication with one or more external devices 850 by way of one or more external networks 880. Vehicle 801 also includes various internal networks 840 for interconnecting several vehicle devices within the vehicle as will be discussed below. The vehicle environment 800 may also include one or more in-vehicle mobile device 830. External devices 850 include any device located outside the vehicle 801 such that the external device must communicate with the vehicle and its devices by an external network 880. For example, the external devices may include mobile devices, electronic devices in networked systems (e.g., servers or clients in a local area network (LAN), etc.), on board computers of other vehicles etc. In-vehicle mobile devices 830 are devices which are located within, or in the vicinity of the vehicle 801 such that the in-vehicle mobile device can communicate directly with internal networks 840 of the vehicle 801. In-vehicle mobile devices 830 may also connect with external networks 880 as discussed below.

Vehicle 801 includes vehicle devices integral with or otherwise associated with the vehicle 801. In the embodiment of FIG. 8, vehicle devices include one or more sensors 803, one or more actuators 805, one or more control units 807, one or more media systems 808, one or more displays 809, one or more routers 811, one or more antenna 813, and one or more on board computers 820. The one or more on board computers 820 may correspond to the control module. As used herein, the term "vehicle device" is meant to encompass sensors, actuators, controllers, electronic control units (ECUs), detectors, instruments, embedded devices, media devices including speakers, a CD and/or DVD player, a radio, etc., vehicle navigation systems (e.g., GPS) displays, other peripheral or auxiliary devices or components associated with the vehicle 801.

Sensors 803 detect various conditions within (or in the immediate vicinity of) the vehicle 801. For example, sensors 803 may be temperature sensors, photosensors, position sensors, speed sensors, angle sensors or any other sensor for detecting a diagnostic condition or other parameter of the vehicle 801 or its ambient environment. Sensors 803 may be passive or "dumb" sensors that provide an analog representative of the sensed parameter, or so called "smart" sensors with integrated memory and digital processing capability to analyze the parameter sensed within the sensor itself Actuators 805 cause motion of some mechanical element of the vehicle in response to a control signal. For example, actuators 805 may be hydraulic actuators, pneumatic actuators or electrical/electronic actuators such as a stepper motor. Actuators 805 may be used to move vehicle lighting devices to implement intelligent light, for example. Actuators 805 may be used to move the one or more mirrors of the vehicle light module 120.

Actuators 805 may also be "dumb" devices that react to a simple analog voltage input, or "smart" devices with built-in memory and processing capability. Actuators 805 may be activated based on a sensed parameter from sensors 803, and one such sensed parameter may be a physical position of the actuator 803 itself. Thus, the sensors 803 and actuators 805 may be connected in a feedback control loop for diagnostic detection and control of the vehicle 801.

Control units 807 include any embedded system, processor, electronic control unit (ECU) or microcontroller. Control unit 807 may be dedicated to a specific region or function of the vehicle 801. For example, control unit 807 can provide memory and control logic functions for several dumb devices, such as passive sensors 803 and actuators 805. In one embodiment, control unit 807 is an ECU dedicated for controlling one or more lighting devices, for example vehicle light module 120, according to embodiments disclosed herein. Typically, numerous ECUs, with different embedded software, may be found in a single automobile and may communicate via internal networks as discussed below.

On-board computer 820 is a vehicle device for providing general purpose computing functionality within the vehicle 801. The on-board computer 820 typically handles computationally intensive functions based on software applications or "apps" loaded into memory. On-board computer 820 may also provide a common interface for different communication networks in the vehicle environment 800. On-board computer 820 includes one or more processor 821, one or more memory 823, one or more user interface 825 (e.g., the operator interface described previously herein), and one or more network interface 827. One or more display 809 and one or more router 811 may be an integral part of the on board computer 810, or distributed in the vehicle and associated with the on-board computer and other vehicle devices. Separate displays 809 may be provided in suitable locations for access by a driver and passengers in the vehicle 801.

On-board computer 820, and other associated or integrated components such as vehicle devices can include one or more memory element 823 for storing information to be used in achieving operations associated with control of one or more vehicle lights as disclosed herein. Further, these devices may keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in vehicle environment 800 could be provided in any database, register, table, cache, queue, control list, or storage structure, based on particular needs and implementations, all of which could be referenced in any suitable timeframe.

In example embodiments, the operations for controlling the vehicle light module 120 may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar vehicle device, etc.). In some of these instances, one or more memory elements (e.g., memory 823) can store data used for the operations described herein. This includes the memory elements being able to store software, logic, code, or processor instructions that are executed to carry out the activities described in this Specification.

Processor 821 can execute software or algorithms to perform activities to enable control of lighting devices disclosed herein. A processor 821 can execute any type of instructions associated with the data to achieve the operations detailed herein. In one example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of computer-readable mediums suitable for storing electronic instructions. Any of the potential processing elements, modules, microprocessors, digital signal processors (DSPs), and other devices described herein should be construed as being encompassed within the broad term 'processor.'

Elements of FIG. 8 may be communicatively coupled to one another by one or more suitable communications medium (e.g., wired, wireless, optical) that provides a pathway for electronic communications. Any element in FIG. 8 may act as a network node in communication with any other element of FIG. 8 also acting as a network node. Any suitable network messaging protocol, network topology or network geographic scope may be included in the vehicle environment 800. Thus, embodiments of on-board computer 820 may include one or more distinct interfaces, represented by network interfaces 827, to facilitate communication via the various networks (including both internal and external networks) described herein. Such network interfaces 827 may be inclusive of multiple wireless interfaces (e.g., WiFi, WiMax, 3G, 4G, white space, 802.1 1x, satellite, Bluetooth, LTE, GSM/HSPA, CDMA/EVDO, DSRC, CAN, GPS, etc.). Other interfaces represented by network interfaces 827, may include physical ports (e.g., Ethernet, USB, HDMI, etc.), interfaces for wired and wireless internal subsystems, and the like. Similarly, each of the nodes of vehicle environment 800 can also include suitable interfaces for receiving, transmitting, and/or otherwise communicating data or information in the vehicle environment 800.

Multiple internal vehicle networks represented by 840 may exist in the vehicle 801 to provide communication pathways to various vehicle devices distributed throughout the vehicle 801. An internal vehicle network 840 is a collection of nodes, such as vehicle devices, integrated with or otherwise linked to the vehicle and interconnected by communication means. Vehicle networks 840 typically include hard wired bus type networks, each providing communication pathways to particular vehicle devices distributed throughout a vehicle. FIG. 8 shows four examples of such hard wired networks: Controller Area Network (CAN) 841, Local Internet Network (LIN) 843, Flexray bus 845, and Media Oriented System Transport (1\rIOST) network 847.

CAN bus 841 uses a message based protocol, designed for and typically used by automotive applications. The CAN bus 841 is a vehicle bus standard designed to allow microcontrollers, sensors, and other devices to communicate with each other via the CAN without a host computer. CAN protocol may be used for soft real-time control of devices such as a vehicle antilock braking system. For example, CAN bus 841 may connect a transmission sensor and an energy sensor to a main engine controller, and a different CAN bus may connect the main engine controller and a main body controller to on-board computer 820. LIN network 843 may be used to sense external conditions such as light, or to control small mechanisms such as door locking systems. For example, LIN bus 843 may connect a driver's seat actuator, temperature controls, and windshield wiper actuators to a main body controller of a CAN bus.

Flexray bus 845 is typically a dedicated network for hard real-time controllers, used for drive-by-wire and/or brake-by-wire applications in which information from the engine and/or wheels of the vehicle 801 is collected and transmitted to appropriate applications and/or data repositories. For example, Flexray bus 845 may connect a chassis module of the vehicle 801 to on-board computer 820 through an appropriate interface, and/or may connect brakes and electronic stability control (ESB) to the chassis module attached to Flexray 845. MOST network 847 can also be found in vehicles for transmitting audio, video, and voice on fiber optics. MOST buses 847 can connect media system 808, to on-board computer 820 through appropriate interfaces, and/or connect a reversing camera and a navigation system to an intermediate device which is connected to computer by MOST bus 847 such as the projector 202 of the vehicle light module 120.

Other hard wired internal networks such as Ethernet may be used to interconnect vehicle devices in the vehicle 801. Further, internal wireless networks 849, such as near field communications, Bluetooth, etc. may interconnect vehicle devices.

External networks 880 may be accessed from vehicle 801 by vehicle devices and in-vehicle mobile devices 830 when a communication link 835 is available. In-vehicle mobile devices 830 include mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within vehicle environment 800. Data may be any type of numeric, voice, video, or script data, or any type of source or object code, or any other suitable information in any appropriate format that may be communicated from one point to another in electronic devices and/or networks. A vehicle router 811 may also be used to access external network infrastructure within range of the antenna 813 of vehicle 801.

Some form of wireless communication is needed to achieve external network connectivity from vehicle 801. For example third generation (3G), fourth generation (4G), and 3GPP long term evolution (LTE) wireless telephone technologies, worldwide interoperability for microwave access (WiMax), WiFi, and dedicated short-range communications (DSRC) are some of the numerous wireless technologies currently available with the appropriate interfaces and network infrastructure to support the technology.

Users (driver or passenger) may initiate communication in vehicle environment 800 via some network, and such communication may be initiated through any suitable device such as, in-vehicle mobile device 830, display 809, user interface 825, or external devices 850, for example to activate a mode of operation of the vehicle light module 120.

In-vehicle mobile devices 830, and mobile devices external to vehicle 801, may communicate with on-board computer 820 through any wireless or wired communication link and may be configured as a personal area network (PAN) or a wireless personal area network (WP AN) or any other appropriate networking architecture or system that facilitates communications in a network environment. Wired and wireless communication links may any electronic link such as Bluetooth, wireless technologies (e.g., IEEE 802.1 1x), a USB cable, an HDMI cable, etc. In one example, an external mobile device may be connected to computer 820 through a USB cable or wireless network when, for example, the external mobile device is a diagnostic tool used by a mechanic for servicing vehicle 801.

Alternatively, FIG. 2 and the presented embodiments may similarly apply suspension particle devices technology (e.g. suspension particle display, suspended particle dispersion; SPD) into the vehicle light module 120 according to another example. The vehicle light module 120 can include a projector 202 (e.g. projection light source, micro-lens array, laser, etc.) and a panel 204. The panel 204 can provide both transparency and partial or complete opacity. The panel 204 (i.e. screen, film) can represent a Suspension Particle Device (SPD) screen. The panel can also include Polymer Network Liquid Crystal (PNLC) arrangements, polymer dispersed quantum dots, polymer dispersed nanoparticles or the like as would be understood by one of ordinary skill in the art. The panel 204 can also include electrochromic elements whose transmission properties for light can be altered or modified as a function of applied voltages or electrical current. Under opaque conditions, the panel 204 can have a milky opaque appearance. The panel 204 can be opaque in an "Off" mode and can be transparent in an "On" mode. Among alternate implementations, the panel 204 is transparent in an "Off" mode and is opaque in an "On" mode. The "On" mode can be activated by applying a current or voltage to the panel 204. In other implementations, the panel 204 can include a coating. The coating can be a SPD-type film applied to one or more parts of the headlamp assemblies 105a, 105b. As an example, schematic 402 of FIG. 4 represents an exemplary panel 204 in an "Off" mode. The same FIG. 4 also shows schematic 404 as the exemplary panel 204 in an "On" mode. Mutually, it should be noted that the exemplary panel 204 can be opaque in the "Off" mode and can be transparent in the "On" mode.

While certain embodiments have been described herein, these embodiments are presented by way of example only, and are not intended to limit the scope of the disclosure. Using the teachings in this disclosure, a person having ordinary skill in the art can modify and adapt the disclosure in various ways, making omissions, substitutions, and/or changes in the form of the embodiments described herein, without departing from the spirit of the disclosure. Moreover, in interpreting the disclosure, all terms should be interpreted in the broadest possible manner consistent with the context. The accompanying claims and their equivalents are intended to cover such forms or modifications, as would fall within the scope and spirit of the disclosure.

What is claimed is:

1. A vehicle light module comprising:
    a panel having a transparent state and an opaque state, wherein the panel represents a dual projection film or screen; and
    a projector operable to project a light function toward the panel;
    said vehicle light module further including a controller that is configured to change an operation state of the panel between the transparent state and the opaque state,
    wherein the controller is configured to activate a power supply to the panel when in the transparent state and deactivate the power supply when in the opaque state, and
    wherein the projector is configured to project the light function on the panel when in the opaque state and is configured to project another light function through the panel when in the transparent state.

2. The vehicle light module of claim 1, wherein the panel includes a type of Suspended Particle Device (SPD) or Polymer Network Liquid Crystal (PNLC) film or screen device.

3. The vehicle light module of claim 1, wherein the controller manages or regulates power supply to the panel film or screen device.

4. The vehicle light module of claim 1, wherein the controller activates the power supply to the panel when in the transparent state and deactivates the power supply when in the opaque state.

5. The vehicle light module of claim 1, wherein the controller activates the power supply to the panel when in the opaque state and deactivates the power supply when in the transparent state.

6. The vehicle light module of claim 1, wherein the panel includes a type of Polymer Dispersed Liquid Crystal (PDLC), a Polymer Dispersed Quantum Dot or a Polymer Dispersed Nanoparticle film or screen device.

7. The vehicle light module of claim 1, wherein at least one of the following assemblies is included in the vehicle light module: a headlamp assembly, a tail lamp assembly, an auxiliary or an interior lighted assembly.

8. The vehicle light module of claim 1, further comprising: one or more optical elements configured to control an angle or shape of projection of the light function on the second surface.

9. The vehicle light module of claim 1, wherein the second surface is a road or air space around a vehicle.

10. The vehicle light module of claim 1, wherein the projector is operatively coupled to at least one of the following vehicle structures: a head unit, a windscreen, a window or a transparent surface.

11. The vehicle light module of claim 1, wherein the light function is associated with a legal light output or legal function.

12. A headlight assembly, comprising:
    a number of vehicle light modules, where each of the vehicle light modules include a panel having a transparent state and an opaque state, wherein each panel represents a dual projection film or screen;
    a projector media system is configured to project a number of light functions or information towards a number of respective panels, wherein said light functions or information is configured to display on each respective panel during an opaque state and is configured to display another light function or information through each associated panel when in a transparent state;
    said headlight assembly further comprises a controller that changes an operation state of each respective panel between the transparent and opaque states, and
    wherein the projector media system is configured to project said light functions or information on each respective panel when in the opaque state and is configured to project another light function or information through each associated panel when in the transparent state.

13. The headlight assembly of claim 12, further comprising a controller configured to change the operation state of each panel between the transparent state and the opaque state.

14. The headlight assembly of claim 12, wherein the panel includes a type of Suspended Particle Device (SPD) or Polymer Network Liquid Crystal (PNLC).

15. The headlight assembly of claim 12, wherein the controller is configured to manage or regulate a power supply to each respective panel and
    activates the power supply to the panel when in the transparent state and deactivates the power supply when in the opaque state.

16. The headlight assembly of claim 12, wherein the panel includes a type of Polymer Dispersed Liquid Crystal (PDLC), a Polymer Dispersed Quantum Dot or a Polymer Dispersed Nanoparticle film or screen device.

17. The headlight assembly of claim 10, wherein the vehicle light module further includes one or more optical elements configured to control an angle or shape of projection of said light functions or information through each respective panel.

18. A method of communicating information via a vehicle light module, the method comprising:
- receiving a number of light output-functions at said vehicle light module; and
- projecting the at least one visual representation toward a panel comprising a dual projection film or screen having a transparent state and an opaque state, wherein said light output-functions are displayed on the panel when in an opaque state and another light output-function is displayed through the panel when in a transparent state.

19. The method of claim 18, further comprising: changing, using a controller, an operation state of the panel between the transparent state and the opaque state.

20. The method of claim 19, wherein the controller controls a power supply to the panel.

* * * * *